Sept. 8, 1959

H. M. STEELE, JR 2,902,863

RATE GYROSCOPE

Filed June 19, 1957

INVENTOR:
HARRY M. STEELE, JR.

BY Theodore E. Bieber

Attorney.

Sept. 8, 1959      H. M. STEELE, JR      2,902,863

RATE GYROSCOPE

Filed June 19, 1957      3 Sheets-Sheet 2

INVENTOR:
HARRY M. STEELE, JR.

BY Theodore E. Bieber

Attorney.

Sept. 8, 1959 H. M. STEELE, JR 2,902,863
RATE GYROSCOPE
Filed June 19, 1957 3 Sheets-Sheet 3

INVENTOR:
HARRY M. STEELE, JR.
BY
Theodore E. Bieber
Attorney.

United States Patent Office 2,902,863
Patented Sept. 8, 1959

2,902,863
RATE GYROSCOPE

Harry M. Steele, Jr., Phoenix, Ariz., assignor to The Garrett Corporation, Los Angeles, Calif., a corporation of California Application June 19, 1957, Serial No. 666,673

11 Claims. (Cl. 74—5.5)

This invention pertains to gyroscopes, and more particularly to a miniature rate gyroscope for use in various types of guidance systems.

One of the important elements of any guidance system, such as those used on aircraft or missiles, is a dependable rate gyroscope. In the case of missile guidance systems, where the complete guidance system is expendable, the rate gyroscope in addition to being dependable, should be relatively inexpensive. The problem of producing a dependable rate gyroscope which is relatively inexpensive to manufacture involves the designing of a gyroscope which uses easily fabricated parts, and requires a minimum of adjustment after its final assembly.

Several problems must be solved in order to provide a dependable yet inexpensive rate gyroscope. For example, some means must be provided for supporting the gimbal assembly without using support means which are so large as to affect the output of the gyroscope. In addition, some means for damping the gimbal assembly must be incorporated in the gyroscope in order to prevent oscillation of the gimbal assembly when the gyroscope is precessed.

In the past, it has been suggested to float the gimbal assembly in a fluid which has essentially the same density as the gimbal assembly in order for the fluid to support the gimbal assembly instead of the gimbal bearings or other support means. It has also been suggested that the fluid drag between the gimbal assembly and the gyroscope case could be used as a damping means to prevent oscillation of the gimbal assembly. While this construction provides an effective damping means, it creates the additional problems of providing some means for compensating for temperature changes so that a substantially constant damping action is achieved, and providing a means for adjusting the damping mechanism during assembly to compensate for manufacturing tolerances.

This invention solves the problem of manufacturing a relatively inexpensive rate gyroscope by providing a design in which all of the adjustments are performed during the assembly of the various components of the gyroscope, so that after the final assembly only minor adjustments are required. These minor adjustments can be made from the outside of the gyroscope, and it is not necessary to disassemble the gyroscope to make the adjustments. This invention also increases the utility of the gyroscope by providing means for interchanging alternating current and direct current pick-offs and gimbal stops which requires no structural changes, thus providing either an alternating current or direct current signal from the same basic gyroscope.

This invention in addition solves the difficulty of voids created in the gyroscope housing by the contracting of the fluid used for floating the gimbal assembly by providing an inexpensive and easily fabricated expansion chamber which will expand and contract with temperature changes.

In order to dampen the oscillations of the gimbal assembly when it is precessed, this invention utilizes the fluid drag between the gimbal assembly and a stationary portion of the gyroscope case as a damping means. The distance between the gimbal assembly and the stationary portion of the gyroscope case is adjusted by temperature sensitive means so that a substantially constant damping action is provided. In addition to changing the distance between the gimbal assembly and the gyroscope case, the area which is subjected to the fluid drag is also increased as the temperature increases. The combination of decreasing distance and increasing area will provide a substantially constant damping action as the temperature of the fluid in which the gimbal assembly is supported varies.

Accordingly, it is the principal object of this invention to provide a low cost rate gyroscope having simplified adjustments and easily fabricated parts.

Another object of this invention is to provide a rate gyroscope with a novel damping system having automatic temperature compensating means so as to provide a substantially constant damping action over a wide temperature range.

Still another object of this invention is to provide a rate gyroscope with a novel damping means which is easily adjusted without disassembling the gyroscope to compensate for manufacturing tolerances.

A still further object of this invention is to provide a rate type of gyroscope with novel means for mounting the gimbal stops and the pick-off device to permit either alternating current or direct current pick-off devices to be utilized without changing any of the structural parts of the gyroscope.

A further object of this invention is to provide a novel centrifugal switch for governing the speed of the gyroscope motor which is cheap to manufacture and easy to adjust.

A still further object of this invention is to provide a unique expansion chamber for the case of a floated type of gyroscope that is easily fabricated and installed in the gyroscope case.

These and further objects and advantages of this invention will be more apparent to those skilled in the art to which it pertains from the following detailed description of a preferred embodiment when taken in conjunction with the accompanying drawings, in which.

Figures 1, 2:
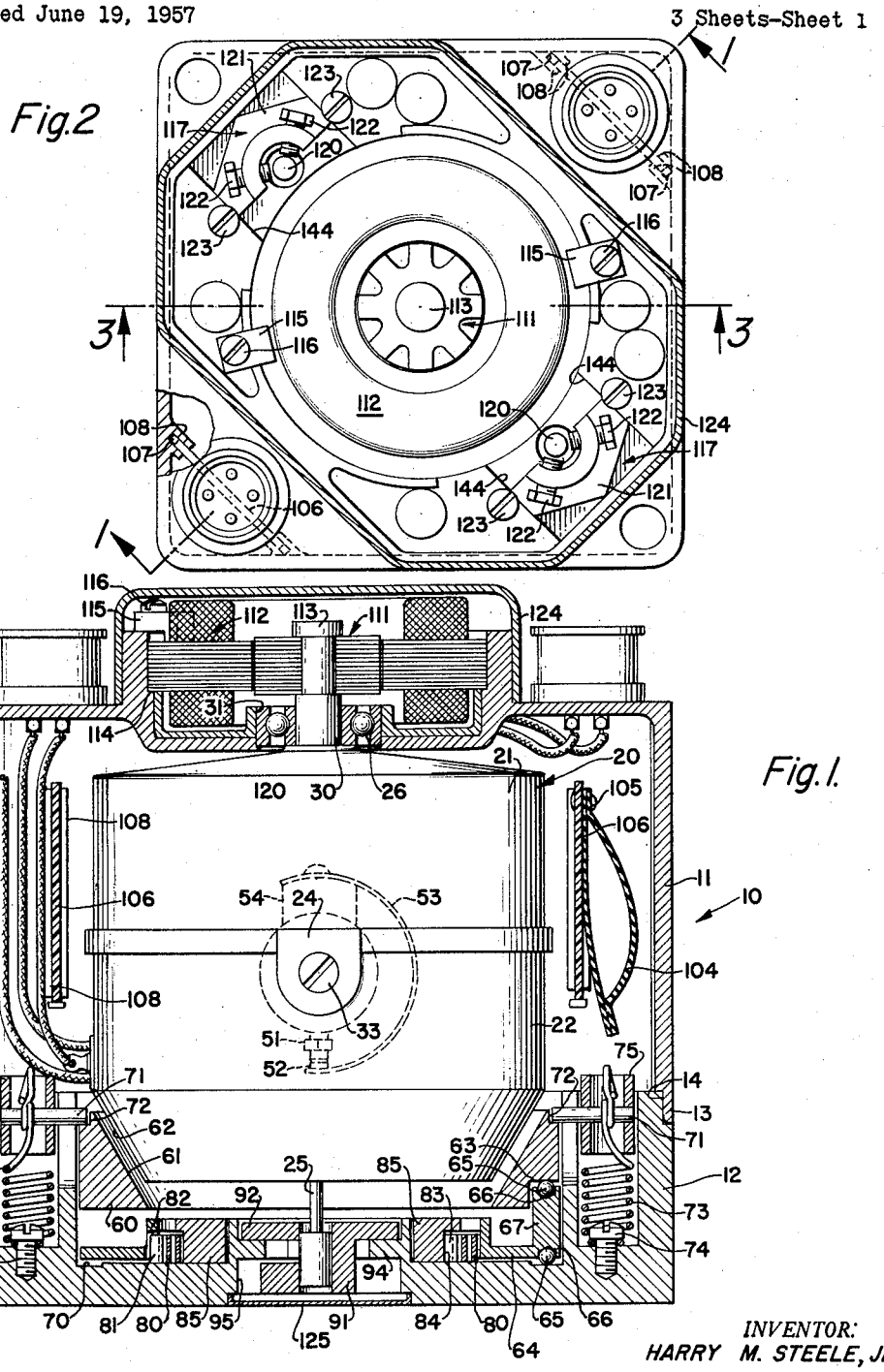
Fig. 1 is a vertical section taken along line 1—1 of Fig. 2 and showing a gyroscope constructed according to this invention.
Fig. 2 is a top view with the top cover of the gyroscope removed and showing an alternating current pick-off device.

Referring to Fig. 1, there is shown a rate gyroscope having an outer case 10 consisting of an upper frame 11 which is joined to a lower frame 12. The upper and lower frames are joined together by means of overlapping portions 13 and 14, formed on the upper and lower frames, respectively. The overlapping portions 13 and 14 are provided with sufficient radial clearance so that a suitable cement may be used for fastening the upper and lower frame members together. A suitable cement is one of the epoxy type resins, such as the one known commercially as Armstrong's Epoxy Adhesive No. A2. The outer case is completed by a top cover 124 and a lower cover 125 which are joined to the upper and lower frames by the same cement which is used for joining the upper and lower frames together.

Figure 3:
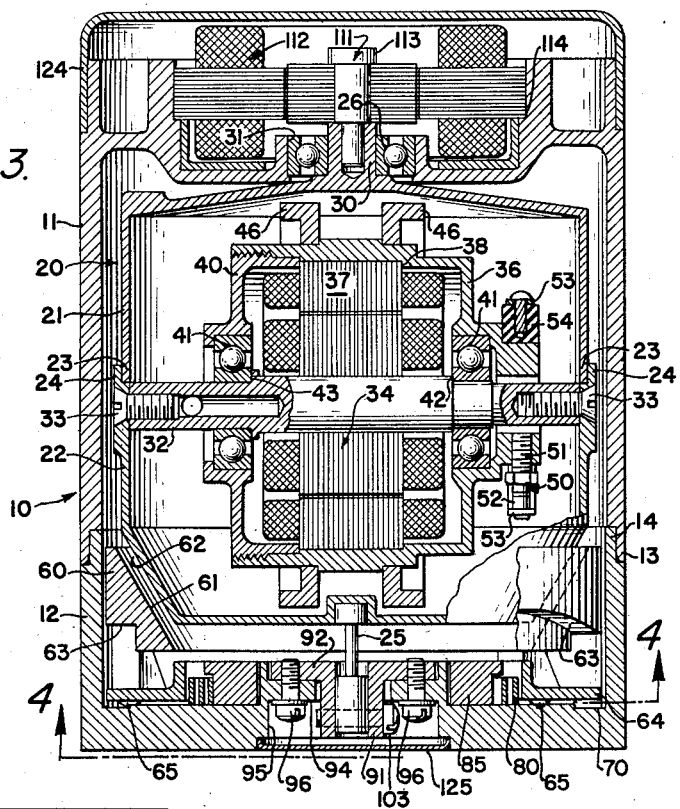
Fig. 3 is another vertical section taken along line 3—3 of Fig. 2 and showing details of the motor and its mounting.

Mounted inside of the outer case is a gimbal assembly 20 having an uper half 21 and a lower half 22 joined together by means of an overlapping portion 23 and an overlapping portion 24, as seen in Fig. 3. The overlapping portions of the upper and lower halves of the gimbal case are joined together in the same manner as the two sections of the outer case of the gyroscope. The gimbal case is supported at its lower end by a torsion rod 25 and at its upper end by a ball bearing 26. The torsion rod 25 is secured to the lower half of the gimbal case by any desired means, such as a force fit or by using the above cement. The inner race of the ball bearing 26 is supported by a cylindrical projection 30 which projects upwardly from the top wall of the upper half of the gimbal case, while the outer race is supported in a circular opening 31 formed in the top wall of the upper frame of the outer gyroscope case. Of course, the axis of the torsion rod 25 and the ball bearing 26 should be aligned and should coincide with the output axis of the gyroscope.

Figure 7:
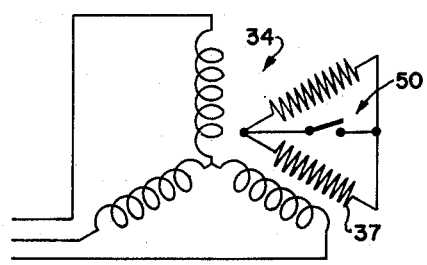
Fig. 7 is a schematic wiring diagram of the gyroscope motor.

A motor shaft 32 is mounted inside the gimbal case by means of two flat-head screws 33 which pass through a slightly thickened section on the lower half of the gimbal case and thread into the ends of the motor shaft. The motor shaft 32 should be mounted so that its axis passes through the output axis of the gyroscope and, in addition, is at right angles to the output axis. Secured to the center portion of the motor shaft is a stator assembly 34 consisting of a stack of suitable laminations having a central opening and outwardly opening slots in which a suitable stator winding is mounted. The motor shown is an alternating current motor and, thus, the stator winding must be of the alternating current type, preferably a three-phase single pole winding, as shown in Fig. 7. While an alternating current motor is shown, a direct current motor could also be used.

The motor rotor consists of a cylindrical housing formed from two sections 36 and 40, which are rotatably supported on the shaft 32 by means of ball bearings 41. The section 40 threads into the open end of the generally cup-shaped section 36 to form the rotor housing. Mounted in the cup-shaped member 36 is a rotor assembly 37 which is forced against an inwardly projecting shoulder 38 formed on the cup-shaped section 36 by the end of the section 40. The rotor assembly 37 consists of a stack of suitable laminations having inwardly opening slots in which a rotor winding is secured. The rotor winding preferably has two separate windings which may be connected either in series or in parallel by means of the centrifugal switch 50, which will be described below, in order to control the speed of the motor.

The end section 40, in addition to locking the rotor assembly in position, secures the ball bearings 41 against outwardly projecting shoulders 42 and 43 formed on opposite ends of the motor shaft 32. Secured to the outer surface of the cup-shaped member 36 by any desired means, such as a force fit, are two inertia rings 46 which increase the momentum of the rotor.

The speed of the motor is controlled by means of a centrifugal switch 50 which is mounted on the end of the cup-shaped section 36. The centrifugal switch consists of an adjustable contact 51 which threads into an opening in the cup-shaped member 36 and a fixed contact 52 mounted on one end of an arcuately shaped spring member 53. The other end of the spring member 53 is secured to an insulating block 54, which in turn is fastened to the cup-shaped member 36 by any desired means, not shown. As shown in Fig. 7, the centrifugal switch 50 is connected to the ends of the two separate rotor windings in order to connect them in either series or parallel to control the speed of the gyroscope motor. It is well known that by connecting the separate rotor windings in parallel or in series the rotor resistance can be varied between two separate limits depending upon the resistance of the two individual windings. This allows the motor to run at a constant speed, at which the motor torque characteristic in the switch closed position provides greater torque than is necessary to maintain the desired speed, and less than the required torque in the switch open position.

The above described gyroscope case and gimbal assembly has several advantages which contribute to its ease of manufacture and relatively low cost. As can be seen, the gyscope case itself can easily be formed from die castings and only minor machining will be required. The gimbal case can also be fabricated from simple die castings, and requires only the machining of the surface 30 on which the upper bearing 26 is mounted. The mounting of the gyroscope motor in the lower half 21 of the gimbal case allows the adjustment of the governing speed of the gyroscope motor to any desired value prior to final assembly of the gimbal case. This eliminates the possibility of having to disassemble the gimbal case after it is assembled in order to adjust the speed of the motor. The speed of the gyroscope motor is easily adjusted by adjusting the position of the adjustable contact 51 of the centrifugal switch 50.

Figure 6:
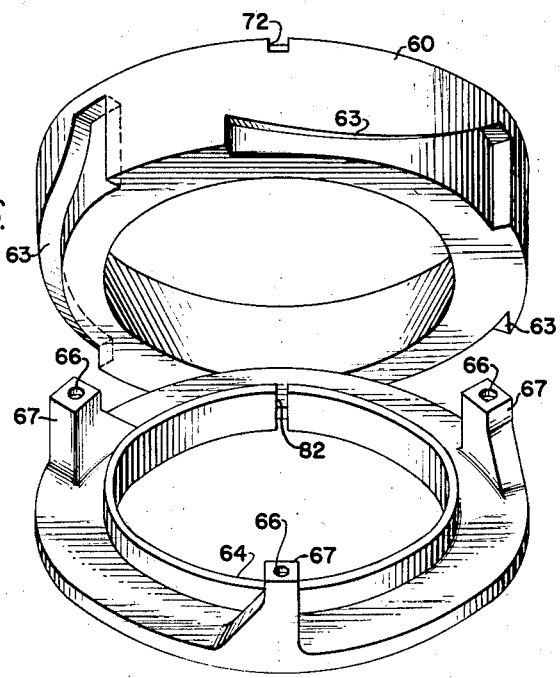
Fig. 6 is a perspective view of the damping ring and actuating ring used for moving the damping ring to compensate for temperature changes.

The damping means utilized in the gyroscope of the present invention is shown in Figs. 1, 3 and 6, and consists of a damping ring 60 and a truncated conically shaped end 62 formed on the lower half of the gimbal case. Temperature responsive means are provided for adjusting the axial distance between the inclined inner surface of the damping ring 60 and the conical end 62 so as to compensate for the changes in temperature of the fluid used for floating the gimbal assembly. The damping ring 60 is provided with three circumferentially spaced axial cam surfaces 63 adjacent its outer diameter as shown in Figs. 3 and 6. The damping ring 60 is moved in an axial direction by means of an actuating ring 64 which engages the cam surfaces 63 on the damping ring. The actuating ring 64 consists of a ring-shaped base having three circumferentially spaced posts 67, each of which is provided with a small cylindrical depression 66 at its upper end. A similar cylindrical depression 66 is provided on the bottom surface of the actuating ring 64 in line with the depression 66 at the top of the post. A small ball 65 is mounted in each of the depressions so as to reduce the friction between the upper ends of the posts 67 and the cam surface 63 and the lower surface of the actuating ring 64 and the lower frame 12 of the gyroscope case. The lower frame 12 of the gyroscope case is provided with a circular depression 70 which acts as a raceway for the balls 65 mounted in the depressions 66 in the lower surface of the actuating ring.

The cam surfaces 63 on the actuating ring are urged into engagement with the balls 65 mounted in the top of the posts 67 by means of two diametrically opposite tension springs 73. The lower end of each of the springs 73 is secured to the bottom of a hole formed in the lower frame 12 by means of cap screws 74 which pass through the last turn of the spring and thread into the frame member. The upper end of each of the springs is provided with a loop in which a retaining pin 71 is mounted. The retaining pin 71 engages a notch 72 formed in the outer surface of the damping ring 60 so as to urge it in a downward direction. A guide bushing 75, which surrounds the upper end of the spring 73 and has aligned openings for the retaining pin 71 is provided for insuring proper alignment of the spring 73 and retaining pin 71.

The actuating ring 64 is rotated in response to changes in the temperature of the fluid floating the gimbal assembly by means of a bimetal spring 80 in order to raise or lower the damping ring 60. Raising the damping ring 60 decreases the distance between the damping ring and the lower end of the gimbal case, thus, maintaining a constant damping action even though the viscosity of the fluid is decreased with an increase in temperature.

Figure 4:
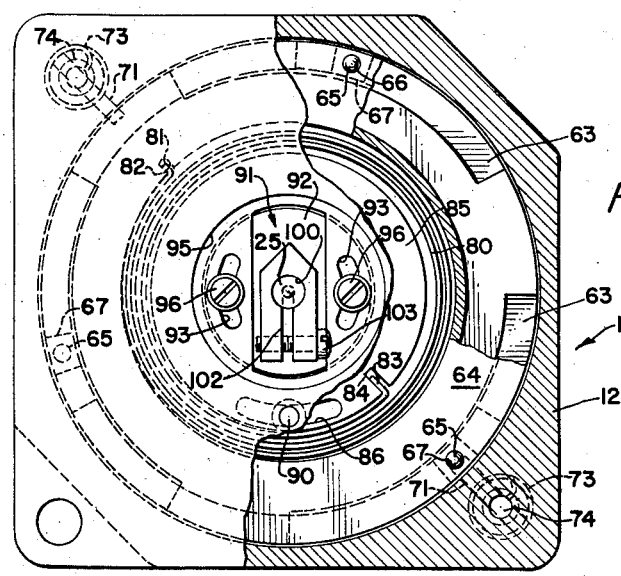
Fig. 4 is a bottom view of the gyroscope taken along line 4—4 of Fig. 3 with a portion of the lower frame removed to show the details of temperature compensating means of the damping system.

The bimetal spring 80 is wound in a spiral which has its end portion 81 bent at right angles to the main portion of the spring. The end 81 fits into a notch 82 formed on the inner surface of the actuating ring 64, as shown in Fig. 4. The inner end of the bimetal spring is provided with an end portion 83 which is also bent at right angles to the bimetal spring and projects into a notch 84 formed in a retaining ring 85. The retaining ring 85 rotates about the outer surface of an upwardly projecting cylindrical portion of the lower frame 12 and is locked in place by means of a flat head cap screw 90. The flat head screw 90 passes through an arc-shaped opening 86 in the ring 85 and threads into the lower frame 12. The arc-shaped opening 86 allows the retaining ring 85 to be rotated over a limited distance so as to adjust the initial tension in the bimetal spring 80. The adjustment of the initial tension in the bimetal spring 80 provides a coarse adjustment of the damping ring 60, as will be explained more fully below.

Positioned in a central opening 95 in the lower frame 12 is a torsion rod clamp member 91. The torsion rod clamp member 91 has an outwardly projecting flange 92 at its upper end which rests on two diametrically opposite webs 94 projecting inwardly from the inner surface of the central opening 95. Each of the webs 94 is provided with an arc-shaped slot 93, as seen in Fig. 4, so that a cap screw 96 may pass through the web and thread into the torsion rod clamp member 91 to lock it in position. The clamp member 91 is provided with a central opening 100 and a radial slot 102 so that a screw 103 which passes through one leg of the clamp member may thread into the other leg to lock the clamp member securely to the lower end of the torsion rod 25.

The gyroscope case is provided with an expansion member 104, one end of which is secured to a flat plate 106 by means of a strap 105 and suitable fastening means. The flat plate 106 is retained in opposed grooves 107 formed by ledges 108 projecting from the inner surface of the upper frame 12 by means of a force fit. The expansion member 104 consists of a short length of plastic tubing such as silicone rubber, which is sealed at both ends so as to entrap a quantity of air or other gas. A second flat plate 106 is mounted diametrically opposite the first flat plate 106 and is used for confining the motor connections to a corner of the outer case.

The method and steps necessary to assemble the above gyroscope will now be described, inasmuch as they contribute greatly to the ease of manufacture and low cost of the gyroscope. The first step in assembling the gyroscope is to assemble all of the various parts of the damping mechanism in the lower frame member 12. The lower frame member may then be placed on a flat surface and the height of the upper edge of the damping ring 60 accurately measured. The retaining ring 85 may then be rotated so as to adjust the initial tension on the bimetal spring 80, which in turn will adjust the height of the upper edge of the damping ring 60 above the flat surface. The height of the upper edge of the damping ring 60 above the flat surface, of course, will vary depending upon the temperature of the atmosphere surrounding the damping ring at the time the adjustment is made. This adjustment of the damping ring 60 provides a coarse adjustment of the damping ring prior to final assembly of the gyroscope.

The gimbal assembly 20 with the torsion rod 25 in place can then be mounted in the lower frame 12. When the gimbal assembly is placed in the lower frame 20, three suitable size wires are placed on the inclined surface 61 of the damping ring 60 so as to give a proper axial spacing between surface 62 on the gimbal assembly and the damping ring 60. The screw 103 in the torsion rod clamp member 91 is then tightened to lock the gimbal assembly in place. The three wires are then removed and the upper half of the outer gyroscope case positioned over the top of the gimbal assembly. The two halves of the gyroscope case can then be secured together, as previously described. The size of the three wires, of course, depends again on the temperature of the surrounding atmosphere.

Figure 3A:
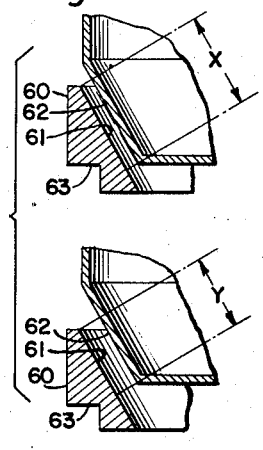
Fig. 3a is a fragmentary sectional view showing a portion of the gimbal assembly and damping mechanism in a different position than that shown in Fig. 3.

It will be readily appreciated by those skilled in the art that, by providing the two inclined surfaces 61 and 62 in the damping assembly, this invention permits the use of three wires for accurately gaging the distance between these two surfaces. This insures accurate spacing of the damping assembly prior to assembly of the gyroscope so that no further adjustment is necessary. An advantage also secured by providing the damping assembly with the inclined surfaces 61 and 62 is that when the temperature of the fluid in the case varies, the spacing between the surfaces 61 and 62 and the effective areas of the overlapping portions of such surfaces will be simultaneously changed to compensate for the change in viscosity of the gimbal floating fluid. The comparison illustrated in Fig. 3a shows how the distance between the surfaces 61 and 62 changes upon movement of the ring 60, while the surfaces remain in parallel relation. Such comparison also shows that the effective damping areas of the surfaces vary during movement of the member 60. In Fig. 3a the letters X and Y indicate the effective overlapping or registering areas of the surfaces in different positions of the member 60. The fluid drag damping systems of previous rate gyroscopes have always required that the gyroscope be completely disassembled in order to adjust the distance between two members of the damping assembly, in order to properly space these members. It will be readily appreciated that any assembly and disassembly of the gyroscope in order to adjust it during manufacture greatly increases the cost of the gyroscope. The final adjustment of the gyroscope cannot be performed until the pick-off device, which will be described below, is in place and the gyroscope filled with a suitable fluid.

Shown in Figs. 1 and 2 is an alternating current type of pick-off consisting of a stationary stator assembly 112 which is secured to the upper surface of the gyroscope assembly and a rotor member 111 which is secured to the gimbal assembly by means of a pin 113 which may either thread into the top of the gimbal assembly or be a force fit. The lower surface of the stator assembly rests on an inwardly projecting shoulder 114 formed on the top surface of the gyroscope case, and is retained in place by means of two diametrically opposite clips 115. The clips 115 are secured to the top of the gyroscope case by means of small cap screws 116 which pass through the clips and thread into the top of the gyroscope case. Rotation of the gimbal assembly is limited by two diametrically opposite gimbal stops 117. Each of the gimbal stops consists of a stop pin 120 which projects from the top wall of the gimbal assembly through an opening in the outer case of the gyroscope and an arcuately shaped stop member 121 which is secured to the top wall of the gyroscope case by means of two screws 123. The stop members 121 are mounted in parallel guideways 144 formed in the stop surface of the gyroscope case so that they may be adjusted radially in and out. Each of the stop members 121 is provided with two adjusting screws 122 so that the limits of rotation of the gimbal assembly may be easily adjusted. The gyroscope is completed by filling the gyroscope case with a suitable fluid and installing the upper cover 124 and a lower cover 125 using the same cement used in assembling the halves of the outer gyroscope case.

A suitable fluid for filling the gyroscope case would be any of the silicone oil compounds such as the one known commercially as Dow Corning Fluid No. 200. The main requirement of the fluid used for filling the gyroscope case is that its density must be substantially equal to the density of the gimbal assembly 20, and have a reasonably low variation of viscosity with temperature change.

After the gyroscope is completely assembled, the final adjustment of the position of the gimbal assembly may be determined by rotating it about its normal axis which is, of course, the axis which is perpendicular to both the output axis and the spin axis. When the gyroscope is rotated about its normal axis there should be no rotation of the gimbal assembly about its output axis or output from the pick-off device. If there is any output from the pick-off device, the torsion rod clamp must be moved slightly so as to reduce the output of the pick-off device substantially to zero.

Figure 5:
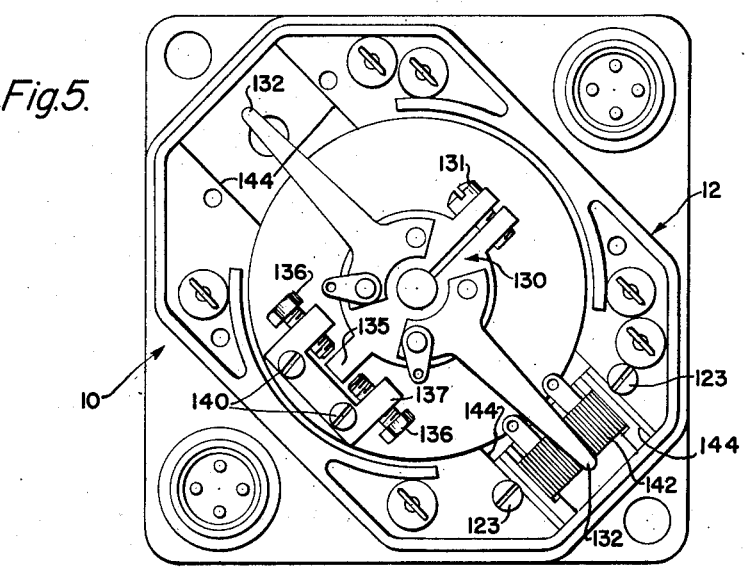
Fig. 5 is a top view with the top cover removed showing the mounting of a direct current pick-off device.

Shown in Fig. 5 is a plan view of the same gyroscope which was described above, but with a direct current pick-off device mounted on the gyroscope. The direct current pick-off device utilizes the same upper frame member 11 which was utilized with an alternating current pick-off device. The direct current pick-off device consists of the wiper arm base 130 secured to a pin 113 which projects upwardly from the top of the gimbal assembly 20. The wiper arm base 130 is secured to the pin by means of a cap screw 131, which passes through one leg of a clamp portion of the base 130 and threads into the other leg so as to tighten the clamp portion securely to the pin. The wiper arm assembly is provided with two diametrically opposite wiper arms 132 which are secured to the wiper arm base by any desired means, such as cap screws or the like.

The outer end of each of the wiper arms travels over a suitable potentiometer card 142 (only one shown) which is secured in guideways 144, previously described, by means of the two screws 123. By utilizing the guideways, the radial position of the potentiometer card 142 may be adjusted which, in turn, provides a means for adjusting the sensitivity of the direct current pick-off. The gyroscope stops utilized with the direct current pick-off device consist of a stop member 135 formed on the wiper arm base 130 and projecting radially outward to engage the adjusting screws 136 mounted in the stop member 137. The stop member 137 in turn is secured to the top wall of the upper frame 112 by means of two screws 140, or the like.

As can be seen from the above description, this invention provides a rate type of gyroscope utilizing substantially all die cast parts which require a minimum of machining. The invention also provides a gyroscope in which only one final adjustment is required after the gyroscope is assembled. The independent adjustments of the various parts of the gyroscope during assembly, eliminates the greatest item of cost in the manufacture of rate gyroscopes and prevents the deterioration of quality by excessive handling. Previously, it was necessary to completely assemble the gyroscope, test it, then disassemble it to make the adjustments to the various elements of the gyroscope. Often times, this procedure had to be repeated numerous times till a dependable gyroscope could be provided.

While only one preferred embodiment of the applicant's invention has been described in detail, many modifications will occur to those skilled in the art so that it should not be limited to the particular embodiments shown and described but only to its broad teachings.

I claim:

1. A rate gyroscope comprising: a case; a gimbal assembly having a first damping surface; a torsional resistance element supporting said gimbal assembly in said case for limited movement about an axis; movement indicating means in operative relationship with said gimbal assembly; means for damping the movement of said gimbal assembly, said damping means having a member forming a second damping surface substantially matching that on said gimbal assembly; mounting means adjustably supporting said member with the damping surface thereon in spaced parallel overlapping relationship with that on said gimbal assembly; and temperature responsive means for moving said member relative to said gimbal assembly to vary the spacing between said first and second damping surfaces and the areas thereof in overlapping relationship while the parallel relationship between such surfaces is maintained.

2. A rate gyroscope comprising: a case; a gimbal assembly having a first damping surface; a torsional resistance element supporting said gimbal assembly in said case for limited movement about an axis; movement indicating means in operative relationship with said gimbal assembly; means for damping the movement of said gimbal assembly, said damping means having a member forming a second damping surface substantially matching that on said gimbal assembly; mounting means supporting said member in said case for adjustment relative to said gimbal assembly, portions of the damping surfaces on said gimbal assembly and said member being in spaced parallel registering relationship; and temperature responsive means in said case for moving said member relative to said gimbal assembly to simultaneously vary the area of the portions of the damping surfaces registering with one another and the spacing therebetween.

3. A rate gyroscope comprising: a case; a gimbal assembly having a conical surface; a torsional resistance element supporting said gimbal assembly in said case for limited movement about an axis; movement indicating means in operative relationship with said gimbal assembly; means for damping movement of said gimbal assembly, said damping means having an annular member forming a conical surface substantially matching that on said gimbal assembly; mounting means adjustably supporting said annular member with the conical surface thereon in spaced overlapping relationship with that of said gimbal assembly; and temperature responsive means for moving said annular member axially relative to said gimbal assembly to vary the spacing between said conical surfaces and the areas thereof in overlapping relationship.

4. A damping device for a rotatable body immersed in a fluid filled casing comprising: means for mounting said body in said casing for rotation about a fixed axis; a ring-shaped member having a conical surface formed on its inner surface, said ring member being mounted in said casing coaxially with said fixed axis; a conical surface formed on one end of said body coaxially with said ring member and spaced therefrom; a plurality of circumferentially spaced cam surfaces formed on said ring member adjacent the outer periphery thereof; a cam actuating member mounted in said casing and disposed to rotate about said rotational axis; and rotating means responsive to the temperature of said fluid for rotating said actuating member to adjust the distance between said ring member and said body.

5. A damping device for a rotatable body immersed in a fluid filled casing comprising: means for mounting said body in the casing for rotation about a fixed axis; a ring-shaped member mounted in said casing coaxially with said fixed axis and adjacent one end of said body; a conical surface formed on the inner surface of said ring member; a mating conical surface formed on said one end of the body and axially spaced from the conical surface on said ring member; a plurality of circumferentially spaced cam surfaces formed on said ring member adjacent the outer surface thereof, said cam surfaces being inclined at an angle to a surface normal to said fixed axis; an actuating ring mounted in said casing and engaging said cam surfaces; and temperature responsive means for moving said actuating ring to adjust the axial position of said ring member in response to the temperature of said fluid.

6. A rate gyroscope comprising: a rotating gyroscope element, said gyroscope element being mounted in a sealed casing with its spin axis fixed to said casing, said sealed casing being rotatably mounted at one end in a sealed housing coaxially with the output axis of said gyroscope element, the opposite end of said sealed casing being resiliently supported in said housing coxially with said output axis, one of the ends of said sealed casing terminating in a truncated conical shape; a ring member mounted in said housing for movement along said output axis, the inner surface of said ring member having a conical shape, the conical inner surface of said ring being axially spaced from the conically shaped end of said casing; a cam-shaped surface formed on said ring member normal to said output axis; a cam actuating member mounted in said housing and disposed to engage said cam surface and move said ring member along said output axis, said housing being filled with a fluid having substantially the same density as the density of said sealed casing and said rotating gyroscope element; and means responsive to the temperature of said fluid for moving said actuating member.

7. A rate gyroscope comprising: a case; a gimbal assembly having a conical surface; a torsional resistance element supporting said gimbal assembly in said case for limited movement about an axis; movement indicating means in operative relationship with said gimbal assembly; means for damping movement of said gimbal assembly, said damping means having an annular member forming a conical surface substantially matching that on said gimbal assembly; mounting means adjustably supporting said annular member with the conical surface thereon in spaced overlapping relationship with that of said gimbal assembly; resilient means tending to move said annular member axially relative to said gimbal assembly in a direction to change the spacing between said conical surfaces and the areas thereof in overlapping relationship; and temperature responsive means for moving said annular member in opposition to said resilient means.

8. A rate gyroscope comprising: a case; a gimbal assembly having a conical surface; a torsional resistance element supporting said gimbal assembly in said case for limited movement about an axis; movement indicating means in operative relationship with said gimbal assembly; means for damping movement of said gimbal assembly, said damping means having an annular member forming a conical surface substantially matching that on said gimbal assembly; mounting means adjustably supporting said annular member with the conical surface thereon in spaced overlapping relationship with that of said gimbal assembly; spring means tending to move said annular member axially relative to said gimbal assembly in a direction to change the spacing between said conical surfaces and the areas thereof in overlapping relationship; and temperature responsive means for moving said annular member in opposition to said spring means.

9. A rate gyroscope comprising: a case; a gimbal assembly having a conical surface; a torsional resistance element supporting said gimbal assembly in said case for limited movement about an axis; movement indicating means in operative relationship with said gimbal assembly; means for damping movement of said gimbal assembly, said damping means having an annular member forming a conical surface substantially matching that on said gimbal assembly; mounting means adjustably supporting said annular member with the conical surface thereon in spaced overlapping relationship with that of said gimbal assembly; resilient means tending to move said annular member axially relative to said gimbal assembly in a direction to change the spacing between said conical surfaces and the areas thereof in overlapping relationship; actuating means for moving said annular member in opposition to said spring means, said actuating means having cam and follower elements between said case and said annular member; and temperature responsive means in operative relation with said cam and follower elements.

10. A rate gyroscope comprising: a case; a gimbal assembly having a conical surface; a torsional resistance element supporting said gimbal assembly in said case for limited movement about an axis; movement indicating means in operative relationship with said gimbal assembly; means for damping movement of said gimbal assembly, said damping means having an annular member forming a conical surface substantially matching that on said gimbal assembly; mounting means adjustably supporting said annular member with the conical surface thereon in spaced overlapping relationship with that of said gimbal assembly; temperature responsive means in said case for moving said annular member axially relative to said gimbal assembly to vary the spacing between said conical surfaces and the areas thereof in overlapping relationship; and motion-transmitting means between said temperature responsive means and said annular member, said motion-transmitting means having a cam surface on said annular member and a follower element between said case and said said cam surface.

11. A rate gyroscope comprising: a case; a gimbal assembly having a first conical damping surface thereon; a torsional resistance element supporting said gimbal assembly in said case for limited rotary movement about an axis; movement indicating means in operative relationship with said gimbal assembly; means for damping the movement of said gimbal assembly, said damping means having a damping member forming a second conical damping surface; mounting means guiding said damping member for movement longitudinally of the axis of rotary movement of said gimbal assembly, portions of said first and second conical damping surfaces being disposed in spaced overlapping relationship; means for moving said member in response to temperature changes, said means having a rotatable actuating member; cooperative cam and follower means on said damping and actuating members; and a thermostatic member operatively engaged with said case and said actuating member to impart rotary movement to the latter in response to temperature changes.

References Cited in the file of this patent

UNITED STATES PATENTS

| | | |
|---|---|---|
| 2,090,401 | Mayo | Aug. 17, 1937 |
| 2,176,804 | Roth et al. | Oct. 17, 1939 |
| 2,208,073 | Hatton | July 16, 1940 |
| 2,718,149 | Bamford et al. | Sept. 20, 1955 |
| 2,763,157 | Summers | Sept. 18, 1956 |
| 2,800,024 | Lear et al. | July 23, 1957 |